(12) United States Patent
Norman

(10) Patent No.: US 7,536,100 B2
(45) Date of Patent: May 19, 2009

(54) POP-TO-POP OPTICAL WAVELENGTH PROTECTION IN A COMMUNICATION SYSTEM

(75) Inventor: Charles W. Norman, Lenexa, KS (US)

(73) Assignee: Sprint Communications Company LP, Overland Park, KS (US)

( * ) Notice: Subject to any disclaimer, the term of this patent is extended or adjusted under 35 U.S.C. 154(b) by 710 days.

(21) Appl. No.: 10/647,935

(22) Filed: Aug. 26, 2003

(65) Prior Publication Data

US 2005/0047787 A1  Mar. 3, 2005

(51) Int. Cl.
*G02F 1/00* (2006.01)

(52) U.S. Cl. .......................................................... 398/5

(58) Field of Classification Search .................... 398/5, 398/19, 7
See application file for complete search history.

(56) References Cited

U.S. PATENT DOCUMENTS

| | | | |
|---|---|---|---|
| 6,081,359 A * | 6/2000 | Takehana et al. | 398/1 |
| 6,122,082 A * | 9/2000 | Fishman | 398/1 |
| 6,272,107 B1 * | 8/2001 | Rochberger et al. | 370/216 |
| 6,898,376 B1 * | 5/2005 | Gerstel et al. | 398/5 |
| 6,915,075 B1 * | 7/2005 | Oberg et al. | 398/9 |
| 6,917,759 B2 * | 7/2005 | de Boer et al. | 398/5 |
| 7,092,642 B2 * | 8/2006 | Way | 398/193 |
| 7,099,578 B1 * | 8/2006 | Gerstel | 398/5 |
| 7,136,583 B2 * | 11/2006 | Oberg et al. | 398/5 |
| 7,151,893 B2 * | 12/2006 | Hayashi et al. | 398/7 |
| 7,164,861 B2 * | 1/2007 | Takachio et al. | 398/70 |
| 7,174,096 B2 * | 2/2007 | Berthold et al. | 398/5 |
| 2002/0172148 A1 * | 11/2002 | Kim et al. | 370/216 |
| 2003/0012129 A1 * | 1/2003 | Lee et al. | 370/216 |
| 2003/0215231 A1 * | 11/2003 | Weston-Dawkes et al. | 398/19 |
| 2004/0001711 A1 * | 1/2004 | Koster et al. | 398/40 |

* cited by examiner

*Primary Examiner*—Shi K Li

(57) ABSTRACT

A communication system includes an optical network, a first POP, and a second POP. The first POP receives user communications from a first user system and transfers the user communications to the optical network over a first optical wavelength. The optical network transfers first user communications to the second POP over the first optical wavelength. The second POP transfers the user communications to a second user system. Responsive to a problem with the transfer of the user communications over the first optical wavelength, the first POP transfers the user communications to the optical network over a second optical wavelength, and the optical network transfers the user communications to the second POP over the second optical wavelength.

24 Claims, 2 Drawing Sheets

POP-TO-POP OPTICAL WAVELENGTH PROTECTION IN A COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to optical wavelength protection in a communication system.

2. Description of the Prior Art

A Point-of-Presence (POP) is the location where a user exchanges their communications with a communication network. The communication network will have several POPs distributed around a geographic area to exchange communications directly with the users or indirectly with the users through other communication systems. The POP may be comprised of a Synchronous Optical Network (SONET) Add/Drop Multiplexer (ADM). Thus, the SONET ADM exchanges communications with the users either directly or indirectly.

The communication system also includes an optical network to process and transfer the user communications between POPs. Thus, the SONET ADM in a first POP receives communications from a first user system and transfers the communications to the optical network. The optical network processes and transfers the user communications to a second SONET ADM in a second POP. The second SONET ADM transfers the user communications to a second user system. Wavelength Division Multiplexing (WDM) systems in the optical network allow the SONET ADMs to transfer the communications from various users over various optical wavelengths.

The SONET ADMs and the optical network may be configured to form SONET rings. If the optical network experiences a fault, such as a fiber cut, then the SONET ADMs re-route the communications around the other side of the ring. Unfortunately, if the SONET ADM in a POP fails, then the SONET ring protection also fails. Thus, the SONET ADMs do not adequately protect user communications from POP-to-POP.

SUMMARY OF THE INVENTION

The invention helps solve the above problems with a communication system that provides POP-to-POP wavelength protection for user communications.

Some examples of the invention include a method of operating the communication system to transfer user communications for a user. The method comprises: in a first POP, receiving first user communications from a first user system and transferring the first user communications to an optical network over a first optical wavelength; in the optical network, receiving the first user communications from the first POP over the first optical wavelength and transferring the first user communications to a second POP over the first optical wavelength; in the second POP, receiving the first user communications from the optical network over the first optical wavelength and transferring the first user communications to a second user system; in the first POP, transferring the first user communications to the optical network over a second optical wavelength instead of the first optical wavelength responsive to a problem with the transfer of the first user communications over the first optical wavelength; in the optical network, receiving the first user communications from the first POP over the second optical wavelength and transferring the first user communications to the second POP over the second optical wavelength; and in the second POP, receiving the first user communications from the optical network over the second optical wavelength instead of the first optical wavelength and transferring the first user communications to the second user system.

Some examples of the invention include a communication system to transfer user communications for a user. The communication system comprises a first POP, a second POP, and an optical network. The optical network is configured to transfer first user communications over a first optical wavelength and over a second optical wavelength. The first POP is configured to receive the first user communications from a first user system and transfer the first user communications to the optical network over the first optical wavelength. Responsive to a problem with the transfer of the first user communications over the first optical wavelength, the first POP is configured to transfer the first user communications to the optical network over the second optical wavelength instead of the first optical wavelength. The second POP is configured to receive the first user communications from the optical network over the first optical wavelength and transfer the first user communications to a second user system, and responsive to the problem with the transfer of the first user communications over the first optical wavelength, to receive the first user communications from the optical network over the second optical wavelength instead of the first optical wavelength and transfer the first user communications to the second user system.

DETAILED DESCRIPTION OF THE PREFERRED EMBODIMENT

Figure 1:
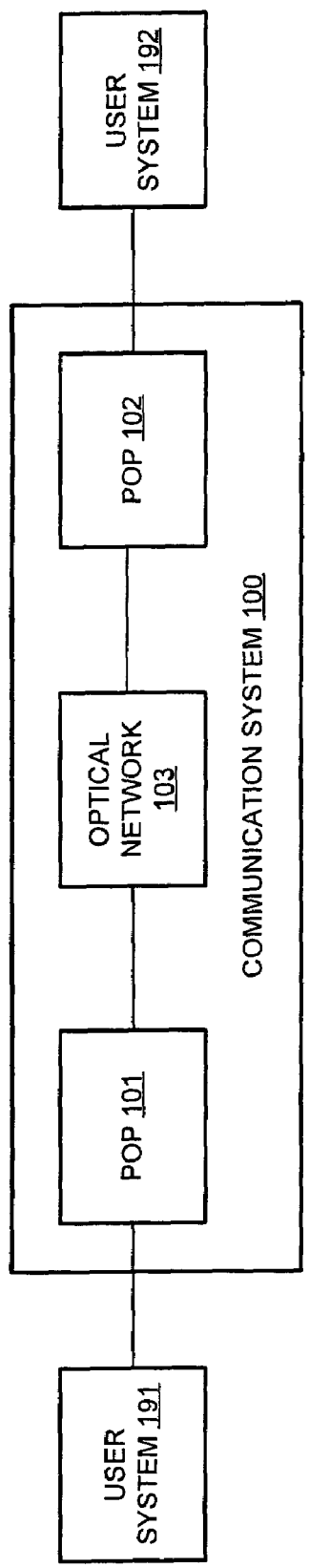
FIG. 1 illustrates a communication system in an example of the invention.
Figure 2:
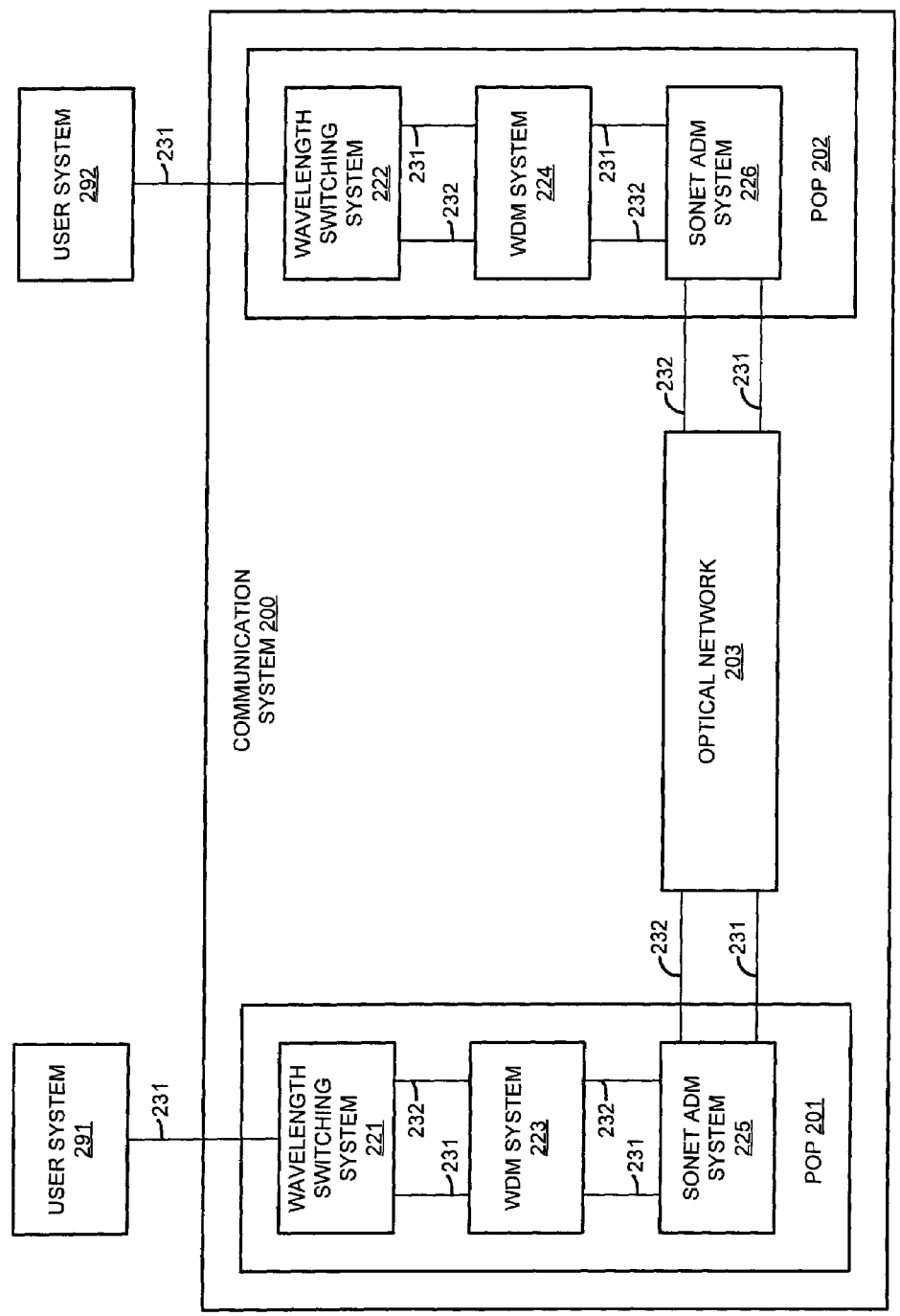
FIG. 2 illustrates a communication system in an example of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

EXAMPLE #1

FIG. 1 illustrates communication system 100 in an example of the invention. Communication system 100 includes Point-of-Presence (POP) 101, POP 102, and optical network 103. Optical network 103 is coupled to POP 101 and to POP 102. POP 101 is coupled to user system 191. POP 102 is coupled to user system 192. User systems 191 and 192 could be the communication equipment of the user or the communication equipment of a service provider that the user uses for access to communication system 100.

POP 101 receives user communications from user system 191. POP 101 transfers the user communications to optical network 103 over a first optical wavelength. Optical network 103 receives the user communications from POP 101 over the first optical wavelength. Optical network 103 transfers the user communications to POP 102 over the first optical wavelength. During the receipt and transfer, optical network 103 may convert the user communications between optical and electrical for storage, routing, or other processing. POP 102 receives the user communications from optical network 103 over the first optical wavelength. POP 102 transfers the user communications to user system 192.

The transfer of the user communications over the first optical wavelength may experience a problem that adversely affects the communication service provided to the user by communication system 100. Examples of such a problem include: 1) faults or fiber cuts in communication system 100, 2) an undesirable level of errors in the user communications, 3) undesirable latency for the user communications, 4) undesirable security for the user communications, or 5) alarms or equipment malfunction in communication system 100. In response to the problem, communication system 100 uses a second optical wavelength that is different from the first optical wavelength for transfer of the user communications. Advantageously, the transfer from the first wavelength to the second wavelength occurs in POPs 101 and 102, so the user benefits from POP-to-POP wavelength protection within communication system 100.

In response to a problem with the transfer of the user communications over the first optical wavelength, POP 101 transfers the user communications to optical network 103 over a second optical wavelength instead of the first optical wavelength. Optical network 103 receives the user communications from POP 101 over the second optical wavelength. Optical network 103 transfers the user communications to POP 102 over the second optical wavelength. POP 102 transfers the user communications to user system 192.

To implement the wavelength switch-over, POPs 101 and 102 coordinate the timing of the switch-over with one another to provide service continuity. The coordination may be provided by an external control system.

In some variations, POP 101 receives the user communications from user system 191 over the first optical wavelength. POP 101 may still receive the user communications from user system 191 over the first optical wavelength even if POP 101 transfers the user communications to optical network 103 over the second optical wavelength.

In some variations, POP 102 transfers the user communications to user system 192 over the first optical wavelength. POP 102 may still transfer the user communications to user system 192 over the first optical wavelength even if POP 102 receives the user communications from optical network 103 over the second optical wavelength.

In some variations, POP 101 detects the problem with the transfer of the user communications over the first optical wavelength.

In some variations, POP 102 detects the problem with the transfer of the user communications over the first optical wavelength and responsively transfers a control instruction to POP 101. POP 101 receives the control instruction and transfers the user communications to optical network 103 over the second optical wavelength responsive to the control instruction.

In some variations, optical network 103 detects the problem with the transfer of the user communications over the first optical wavelength and responsively transfers a control instruction to POP 101. POP 101 receives the control instruction and transfers the user communications to optical network 103 over the second optical wavelength responsive to the control instruction.

In some variations, the user detects the problem with the transfer of the user communications over the first optical wavelength and responsively transfers a control instruction to POP 101. POP 101 receives the control instruction and transfers the user communications to optical network 103 over the second optical wavelength responsive to the control instruction.

In some variations, the user detects the problem with the transfer of the user communications over the first optical wavelength and responsively transfers a control instruction to POP 102. POP 102 receives the control instruction and receives the user communications from optical network 103 over the second optical wavelength responsive to the control instruction.

In some variations, optical network 103 transfers the user communications over the first optical wavelength in a first physical path. If there is a problem with this transmission, then optical system 103 transfers the user communications over the second optical wavelength in a second physical path. In some cases, the first physical path may be geographically diverse from the second physical path. Geographical diversity means that the two physical paths remain physically separated by more than 20 miles except for the portions of optical network 103 coupled with and proximate to POPs 101 and 102. In other cases, the first physical path may be physically diverse from the second physical path. Physical diversity means that the two wavelengths propagate over different optical fibers.

In some variations, user communications that are transferred from user system 192 to user system 191 also obtain the benefits of wavelength protection from communication system 100. POP 102 receives user communications from user system 192. POP 102 transfers the user communications to optical network 103 over a third optical wavelength. Optical network 103 receives the user communications from POP 102 over the third optical wavelength. Optical network 103 transfers the user communications to POP 101 over the third optical wavelength. POP 101 receives the user communications from optical network 103 over the third optical wavelength. POP 101 transfers the user communications to user system 191. In response to a problem with the transfer of the user communications over the third optical wavelength, POP 102 transfers the user communications to optical network 103 over a fourth optical wavelength instead of the third optical wavelength. Optical network 103 receives the user communications from POP 102 over the fourth optical wavelength. Optical network 103 transfers the user communications to POP 101 over the fourth optical wavelength. POP 101 transfers the user communications to user system 191. The third optical wavelength is different from the fourth optical wavelength. The third optical wavelength may be the same as the first or second wavelengths, and the fourth optical wavelength may be the same as the first or second wavelengths—as long as the third and fourth wavelengths remain different from one another. The other variations discussed above are applicable to this variation.

EXAMPLE #2

FIG. 2 illustrates communication system 200 in an example of the invention. Communication system 200 includes POP 201, POP 202, and optical network 203. POP 201 includes wavelength switching system 221, Wavelength Division Multiplexing (WDM) system 223, and Synchronous Optical Network (SONET) Add/Drop Multiplexer (ADM) system 225. POP 202 includes wavelength switching system 222, WDM system 224, and SONET ADM system 226.

Optical network 203 is coupled to SONET ADM system 225 and SONET ADM system 226. SONET ADM system 225 is coupled to WDM system 223. WDM system 223 is coupled to wavelength switching system 221. Wavelength switching system 221 is coupled to user system 291. SONET ADM system 226 is coupled to WDM system 224. WDM system 224 is coupled to wavelength switching system 222. Wavelength switching system 222 is coupled is coupled to user system 292.

User systems 291 and 292 could be the communication equipment of the user or the communication equipment of a service provider that the user uses for access to communication system 200. Typically, optical network 203 includes WDM systems, SONET ADM systems, and switching and routing systems to transfer the user communications. Optical network 203 may also convert the user communications between optical and electrical for storage, routing, or other processing.

Wavelength switching system 221 receives user communications from user system 291 over optical wavelength 231 and transfers the user communications to WDM system 223 over optical wavelength 231. WDM system 223 receives the user communications from wavelength switching system 221 over optical wavelength 231 and transfers the user communications to SONET ADM system 225 over optical wavelength 231. SONET ADM system 225 receives the user communications from WDM system 223 over optical wavelength 231 and transfers the user communications to optical network 203 over optical wavelength 231. Optical network 203 receives the user communications from over optical wavelength 231 and transfers the user communications to SONET ADM system 226 over optical wavelength 231. SONET ADM system 226 receives the user communications from optical network 203 over optical wavelength 231 and transfers the user communications to WDM system 224 over optical wavelength 231. WDM system 224 receives the user communications from SONET ADM system 226 over optical wavelength 231 and transfers the user communications to wavelength switching system 222 over optical wavelength 231. Wavelength switching system 222 receives user communications from WDM system 224 over optical wavelength 231 and transfers the user communications to user system 292 over optical wavelength 231.

The transfer of the user communications over optical wavelength 231 may experience a problem that adversely affects the communication service provided to the user by communication system 200. Examples of such a problem include: 1) faults or fiber cuts in communication system 200, 2) an undesirable level of errors in the user communications, 3) undesirable latency for the user communications, 4) undesirable security for the user communications, or 5) alarms or equipment malfunction in communication system 200. In response to the problem, communication system 200 uses optical wavelength 232 that is different from optical wavelength 231 for transfer of the user communications. Advantageously, the transfer from the wavelength 231 to wavelength 232 occurs in wavelength switching systems 221 and 222, so the user benefits from POP-to-POP wavelength protection within communication system 200. Note that wavelength protection switches 221 and 222 are located on the user side of POPs 201 and 202 to provide true end-to-end wavelength protection within communication system 200.

In response to a problem with the transfer of the user communications over the optical wavelength 231, wavelength switching system 221 transfers the user communications to WDM system 223 over optical wavelength 232 instead of optical wavelength 231. WDM system 223 receives the user communications from wavelength switching system 221 over optical wavelength 232 and transfers the user communications to SONET ADM system 225 over optical wavelength 232. SONET ADM system 225 receives the user communications from WDM system 223 over optical wavelength 232 and transfers the user communications to optical network 203 over optical wavelength 232. Optical network 203 receives the user communications from over optical wavelength 232 and transfers the user communications to SONET ADM system 226 over optical wavelength 232. SONET ADM system 226 receives the user communications from optical network 203 over optical wavelength 232 and transfers the user communications to WDM system 224 over optical wavelength 232. WDM system 224 receives the user communications from SONET ADM system 226 over optical wavelength 232 and transfers the user communications to wavelength switching system 222 over optical wavelength 232. Wavelength switching system 222 receives user communications from WDM system 224 over optical wavelength 232 and transfers the user communications to user system 292 over optical wavelength 231.

To implement the wavelength switch-over, wavelength switching systems 221 and 222 coordinate the timing of the switch-over with one another to provide service continuity. The coordination may be provided by an external control system.

In some variations, wavelength switching system 221 detects the problem with the transfer of the user communications over optical wavelength 231.

In some variations, WDM system 223 detects the problem with the transfer of the user communications over optical wavelength 231 and responsively transfers a control instruction to wavelength switching system 221. Wavelength switching system 221 receives the control instruction and transfers the user communications to WDM system 223 over optical wavelength 232 responsive to the control instruction.

In some variations, SONET ADM system 225 detects the problem with the transfer of the user communications over optical wavelength 231 and responsively transfers a control instruction to wavelength switching system 221. Wavelength switching system 221 receives the control instruction and transfers the user communications to WDM system 223 over optical wavelength 232 responsive to the control instruction.

In some variations, SONET ADM systems 225-226 could be replaced by Gigabit Ethernet systems. Thus, Gigabit Ethernet systems would exchange the user communications between WDM systems 223-224 and optical network 203. Optical network 203 may also use Gigabit Ethernet to transfer the user communications between Gigabit Ethernet systems.

The invention claimed is:

1. A communication system to transfer user communications for a user, the communication system comprising:

an optical network configured to transfer first user communications over a first optical wavelength and over a second optical wavelength;

a first Point-of-Presence (POP) configured to receive the first user communications from a first user system over the first optical wavelength, transfer the first user communications to the optical network over the first optical wavelength, and responsive to a problem detected by the user with the transfer of the first user communications over the first optical wavelength wherein the user transfers a first control instruction to the first POP, to receive the first control instruction and transfer the first user communications to the optical network over the second optical wavelength instead of the first optical wavelength responsive to the first control instruction;

a second POP configured to receive the first user communications from the optical network over the first optical wavelength and transfer the first user communications to a second user system, and responsive to the problem detected by the user with the transfer of the first user communications over the first optical wavelength wherein the user transfers a second control instruction to the second POP, to receive the second control instruction and receive the first user communications from the optical network over the second optical wavelength instead of the first optical wavelength responsive to the second control instruction and transfer the first user communications to the second user system;

the first POP and the second POP configured to coordinate with one another a timing of a switch-over from the first optical wavelength to the second optical wavelength in order to provide service continuity; and the optical network configured to transfer the first user communications over the first optical wavelength in a first physical path and transfer the first user communications over the second optical wavelength in a second physical path wherein the first physical path is geographically diverse from the second physical path.

2. The communication system of claim 1 wherein the second POP is configured to transfer the first user communications to the second user system over the first optical wavelength.

3. The communication system of claim 1 wherein the first POP is configured to detect the problem with the transfer of the first user communications over the first optical wavelength.

4. The communication system of claim 1 wherein:
the second POP is configured to detect the problem with the transfer of the first user communications over the first optical wavelength and transfer a control instruction to the first POP; and
the first POP is configured to receive the control instruction and transfer the first user communications to the optical network over the second optical wavelength responsive to the control instruction.

5. The communication system of claim 1 wherein:
the optical network is configured to detect the problem with the transfer of the first user communications over the first optical wavelength and transfer a control instruction to the first POP; and
the first POP is configured to receive the control instruction and transfer the first user communications to the optical network over the second optical wavelength responsive to the control instruction.

6. The communication system of claim 1 wherein:
the optical network is configured to transfer second user communications over a third optical wavelength and over a fourth optical wavelength;
the second POP is configured to receive the second user communications from the second user system, transfer the second user communications to the optical network over the third optical wavelength, and responsive to a problem with the transfer of the second user communications over the third optical wavelength, to transfer the second user communications to the optical network over the fourth optical wavelength instead of the third optical wavelength; and
the first POP is configured to receive the second user communications from the optical network over the third optical wavelength and transfer the second user communications to the first user system, and responsive to the problem with the transfer of the second user communications over the third optical wavelength, to receive the second user communications from the optical network over the fourth optical wavelength instead of the third optical wavelength and transfer the second user communications to the first user system.

7. The communication system of claim 1 wherein the first POP comprises a wavelength switching system configured to receive the first user communications from the first user system and transfer the first user communications over the first optical wavelength or over the second optical wavelength.

8. The communication system of claim 7 wherein the wavelength switching system is configured to detect the problem with the transfer of the first user communications over the first optical wavelength.

9. The communication system of claim 7 wherein the first POP comprises a Wavelength Division Multiplexing (WDM) system configured to receive the first user communications from the wavelength switching system over the first optical wavelength and transfer the first user communications over the first optical wavelength or to receive the first user communications from the wavelength switching system over the second optical wavelength and transfer the first user communications over the second optical wavelength.

10. The communication system of claim 9 wherein:
the WDM system is configured to detect the problem with the transfer of the first user communications over the first optical wavelength and transfer a control instruction to the wavelength switching system; and
the wavelength switching system is configured to receive the control instruction and transfer the first user communications to the optical network over the second optical wavelength responsive to the control instruction.

11. The communication system of claim 9 wherein the first POP comprises a Synchronous Optical Network (SONET) Add/Drop Multiplexer (ADM) system configured to receive the first user communications from the WDM system over the first optical wavelength and transfer the first user communications to the optical network over the first optical wavelength or to receive the first user communications from the WDM system over the second optical wavelength and transfer the first user communications to the optical network over the second optical wavelength.

12. The communication system of claim 11 wherein:
the SONET ADM system is configured to detect the problem with the transfer of the first user communications over the first optical wavelength and transfer a control instruction to the wavelength switching system; and
the wavelength switching system is configured to receive the control instruction and transfer the first user communications to the optical network over the second optical wavelength responsive to the control instruction.

13. A method of operating a communication system to transfer user communications for a user, the method comprising:
in a first Point-of-Presence (POP), receiving first user communications from a first user system over a first optical wavelength and transferring the first user communications to an optical network over the first optical wavelength;

in the optical network, receiving the first user communications from the first POP over the first optical wavelength and transferring the first user communications to a second POP over the first optical wavelength;

in the second POP, receiving the first user communications from the optical network over the first optical wavelength and transferring the first user communications to a second user system;

in the first POP, receiving a first control instruction and transferring the first user communications to the optical network over a second optical wavelength instead of the first optical wavelength responsive to a problem detected by the user with the transfer of the first user communications over the first optical wavelength wherein the user transfers the first control instruction to the first POP;

in the optical network, receiving the first user communications from the first POP over the second optical wavelength and transferring the first user communications to the second POP over the second optical wavelength;

in the second POP, receiving a second control instruction and receiving the first user communications from the optical network over the second optical wavelength instead of the first optical wavelength responsive to the problem detected by the user with the transfer of the first user communications over the first optical wavelength wherein the user transfers the second control instruction to the second POP and transferring the first user communications to the second user system;

in the first POP and the second POP, coordinating with one another a timing of a switch-over from the first optical wavelength to the second optical wavelength in order to provide service continuity; and in the optical network, transferring the first user communications over the first optical wavelength in a first physical path, and transferring the first user communications over the second optical wavelength in a second physical path, wherein the first physical path is geographically diverse from the second physical path.

14. The method of claim 13 wherein transferring the first user communications to the second user system comprises transferring the first user communications to the second user system over the first optical wavelength.

15. The method of claim 13 further comprising, in the first POP, detecting the problem with the transfer of the first user communications over the first optical wavelength.

16. The method of claim 13 further comprising:
in the second POP, detecting the problem with the transfer of the first user communications over the first optical wavelength and transferring a control instruction to the first POP; and
in the first POP, receiving the control instruction wherein transferring the first user communications to the optical network over the second optical wavelength instead of the first optical wavelength responsive to the problem with the transfer of the first user communications over the first optical wavelength comprises transferring the first user communications to the optical network over the second optical wavelength responsive to the control instruction.

17. The method of claim 13 further comprising:
in the optical network, detecting the problem with the transfer of the first user communications over the first optical wavelength and transferring a control instruction to the first POP; and
in the first POP, receiving the control instruction wherein transferring the first user communications to the optical network over the second optical wavelength instead of the first optical wavelength responsive to the problem with the transfer of the first user communications over the first optical wavelength comprises transferring the first user communications to the optical network over the second optical wavelength responsive to the control instruction.

18. The method of claim 13 further comprising:
in the second POP, receiving second user communications from the second user system and transferring the second user communications to the optical network over a third optical wavelength;
in the optical network, receiving the second user communications from the second POP over the third optical wavelength and transferring the second user communications to the first POP over the third optical wavelength;
in the first POP, receiving the second user communications from the optical network over the third optical wavelength and transferring the second user communications to the first user system;
in the second POP, transferring the second user communications to the optical network over a fourth optical wavelength instead of the third optical wavelength responsive to a problem with the transfer of the second user communications over the third optical wavelength;
in the optical network, receiving the second user communications from the second POP over the fourth optical wavelength and transferring the second user communications to the first POP over the fourth optical wavelength; and
in the first POP, receiving the second user communications from the optical network over the fourth optical wavelength instead of the third optical wavelength and transferring the second user communications to the first user system.

19. The method of claim 13 wherein, in the first POP, receiving the first user communications from the first user system, transferring the first user communications to the optical network over the first optical wavelength, and transferring the first user communications to the optical network over the second optical wavelength instead of the first optical wavelength responsive to the problem with the transfer of the first user communications over the first optical wavelength comprises, in a wavelength switching system, receiving first user communications from the first user system, transferring the first user communications over the first optical wavelength, and transferring the first user communications over the second optical wavelength instead of the first optical wavelength responsive to the problem with the transfer of the first user communications over the first optical wavelength.

20. The method of claim 19 further comprising, in the wavelength switching system, detecting the problem with the transfer of the first user communications over the first optical wavelength.

21. The method of claim 19 wherein, in the first POP, receiving the first user communications from the first user system, transferring the first user communications to an optical network over the first optical wavelength, and transferring the first user communications to the optical network over the second optical wavelength instead of the first optical wavelength responsive to the problem with the transfer of the first user communications over the first optical wavelength comprises, in a Wavelength Division Multiplexing (WDM) system, receiving the first user communications from the wavelength switching system over the first optical wavelength and transferring the first user communications over the first optical wavelength or receiving the first user communications from the wavelength switching system over the second optical wavelength and transferring the first user communications over the second optical wavelength.

22. The method of claim 21 further comprising:
in the WDM system, detecting the problem with the transfer of the first user communications over the first optical wavelength and transferring a control instruction to the wavelength switching system; and
in the wavelength switching system, receiving the control instruction wherein transferring the first user communications to the WDM system over the second optical wavelength instead of the first optical wavelength responsive to the problem with the transfer of the first user communications over the first optical wavelength comprises transferring the first user communications over the second optical wavelength responsive to the control instruction.

23. The method of claim 21 wherein, in the first POP, receiving the first user communications from the first user system, transferring the first user communications to an optical network over the first optical wavelength, and transferring the first user communications to the optical network over the second optical wavelength instead of the first optical wavelength responsive to the problem with the transfer of the first user communications over the first optical wavelength comprises, in a Synchronous Optical Network (SONET) Add/Drop Multiplexer (ADM) system, receiving the first user communications from the WDM system over the first optical wavelength and transferring the first user communications to the optical network over the first optical wavelength or receiving the first user communications from the WDM system over the second optical wavelength and transferring the first user communications to the optical network over the second optical wavelength.

24. The method of claim 23 further comprising:
in the SONET ADM system, detecting the problem with the transfer of the first user communications over the first optical wavelength and transferring a control instruction to the wavelength switching system; and
in the wavelength switching system, receiving the control instruction wherein transferring the first user communications to the WDM system over the second optical wavelength instead of the first optical wavelength responsive to the problem with the transfer of the first user communications over the first optical wavelength comprises transferring the first user communications over the second optical wavelength responsive to the control instruction.

* * * * *